(12) United States Patent
Saeidi

(10) Patent No.: US 7,039,700 B2
(45) Date of Patent: May 2, 2006

(54) SYSTEM AND METHOD FOR MONITORING AND ANALYZING COMMUNICATIONS

(75) Inventor: Babak Saeidi, Denmark (DK)

(73) Assignee: Chatguard.com, Los Angeles, CA (US)

( * ) Notice: Subject to any disclaimer, the term of this patent is extended or adjusted under 35 U.S.C. 154(b) by 808 days.

(21) Appl. No.: 09/826,649

(22) Filed: Apr. 4, 2001

(65) Prior Publication Data

US 2002/0174183 A1    Nov. 21, 2002

(51) Int. Cl.
G06F 15/16    (2006.01)

(52) U.S. Cl. .................... 709/224; 709/225; 709/207
(58) Field of Classification Search ................ 709/224, 709/225, 206, 207
See application file for complete search history.

(56) References Cited

U.S. PATENT DOCUMENTS

| | | | |
|---|---|---|---|
| 5,377,354 A | 12/1994 | Scannell et al. | |
| 5,619,648 A | 4/1997 | Canale et al. | |
| 5,678,041 A | 10/1997 | Baker et al. | |
| 5,696,898 A | 12/1997 | Baker et al. | |
| 5,706,507 A | 1/1998 | Schloss | |
| 5,724,567 A * | 3/1998 | Rose et al. | 707/2 |
| 5,761,662 A * | 6/1998 | Dasan | 707/10 |
| 5,796,948 A | 8/1998 | Cohen | |
| 5,832,212 A | 11/1998 | Cragun et al. | |
| 5,835,722 A | 11/1998 | Bradshaw et al. | |
| 5,884,033 A | 3/1999 | Duvall et al. | |
| 5,933,827 A * | 8/1999 | Cole et al. | 707/10 |
| 5,946,678 A | 8/1999 | Aalbersberg | |
| 5,960,080 A | 9/1999 | Fahlman et al. | |
| 5,996,011 A | 11/1999 | Humes | |
| 6,012,053 A * | 1/2000 | Pant et al. | 707/3 |
| 6,055,542 A * | 4/2000 | Nielsen et al. | 707/104.1 |
| 6,065,055 A | 5/2000 | Hughes et al. | |
| 6,065,056 A | 5/2000 | Bradshaw et al. | |
| 6,072,942 A | 6/2000 | Stockwell et al. | |
| 6,115,709 A * | 9/2000 | Gilmour et al. | 707/9 |
| 6,311,210 B1 * | 10/2001 | Foladare et al. | 709/206 |
| 6,377,949 B1 * | 4/2002 | Gilmour | 707/10 |
| 6,438,579 B1 * | 8/2002 | Hosken | 709/203 |
| 6,442,589 B1 * | 8/2002 | Takahashi et al. | 709/203 |
| 6,493,703 B1 * | 12/2002 | Knight et al. | 707/3 |
| 6,701,362 B1 * | 3/2004 | Subramonian et al. | 709/224 |
| 6,832,224 B1 * | 12/2004 | Gilmour | 707/100 |

* cited by examiner

Primary Examiner—Krisna Lim
(74) Attorney, Agent, or Firm—Crowell & Moring LLP

(57) ABSTRACT

An apparatus and method for identifying digital communications, or analog communications which have been converted to digital, having content considered to be abnormal, undesirable or otherwise inappropriate. The use of specific words are analyzed in the context in which they were used. Digital communications may be monitored and continuously updated to reflect the likelihood that the originator of the message or message stream is engaged in inappropriate communications. Monitoring may be directed to online chat room conversations, email messages or messages posted to an online bulletin board. The level of digital conversation may be correlated to a color scheme indicative of the normality of the conversation. This color scheme may then be used to determine if the ability of a particular user to continue to provide messages should be limited. In this manner, a single individual performing a monitoring function may easily monitor a plurality of text-based conversations. Various embodiments are described.

42 Claims, 7 Drawing Sheets

| Level | Repeated index | Value | Word |
|-------|----------------|-------|------|
| 0 | 1 | 10 | Sex |

SYSTEM AND METHOD FOR MONITORING AND ANALYZING COMMUNICATIONS

BACKGROUND OF THE INVENTION

1. Field of the Invention

The present invention relates in general to a system and method for identifying information and more particularly, to a system and method for monitoring and analyzing communications.

2. Description of the Related Art

Advances in technology have led to the widespread practice of exchanging information and electronic interaction via computer networks such as the World Wide Web (WWW) or the Internet. However, with this improved method of communication has come a heightened risk for inadvertently transmitting sensitive information. For example, the proliferation of email-based interaction has increased the risk of employees transmitting sensitive information to unauthorized persons. Similarly, real-time communication in the context of Internet chat rooms and electronic message boards has increased the risk of individuals divulging information about themselves or others that they may not have otherwise disclosed in a different setting.

This increased risk of inadvertently divulging sensitive information is particularly pronounced in the context of children interacting online with individuals they do not know. While the Internet has provided a powerful medium by which children are able to meet and communicate with other children having common interests, online chat rooms and the like have also served as havens for those with more sinister intentions.

The methods currently available to combat these issues are primitive, often requiring individuals to physically read through text which has been previously transmitted and captured in a database. In the employee email context, employers often resort to physically scanning their employees' email files for evidence of unauthorized information transfers. More sophisticated chat room monitoring systems flag keywords and store their occurrences in a database for later review. However, administration of such systems is extremely cumbersome and their effectiveness has been limited. This use of keyword flags to identify abnormal communications is simply ineffectual to properly evaluate the normality of a given conversation since the context in which the keywords are used is ignored. Rather, to obtain a true value of the normality of a conversation, the context in which the keyboards are used must be considered and given an appropriate weighting.

Thus, what is needed is a system and method which overcomes the aforementioned problems by providing a reliable and context-sensitive system for monitoring text-based communications.

BRIEF SUMMARY OF THE INVENTION

An apparatus and method for monitoring communications is disclosed. The method comprises receiving a message containing one or more words provided by a user, accessing at least a portion of the message and generating user profile data. The user profile data is used to identify the user, and the user profile data corresponds to at least one previous message provided by the user. The method further comprises generating a result indicative of the likelihood that the message relates to a predetermined subject, updating the user profile data with the result. Various embodiments are described.

DETAILED DESCRIPTION OF THE PREFERRED INVENTION

Figure 1A:
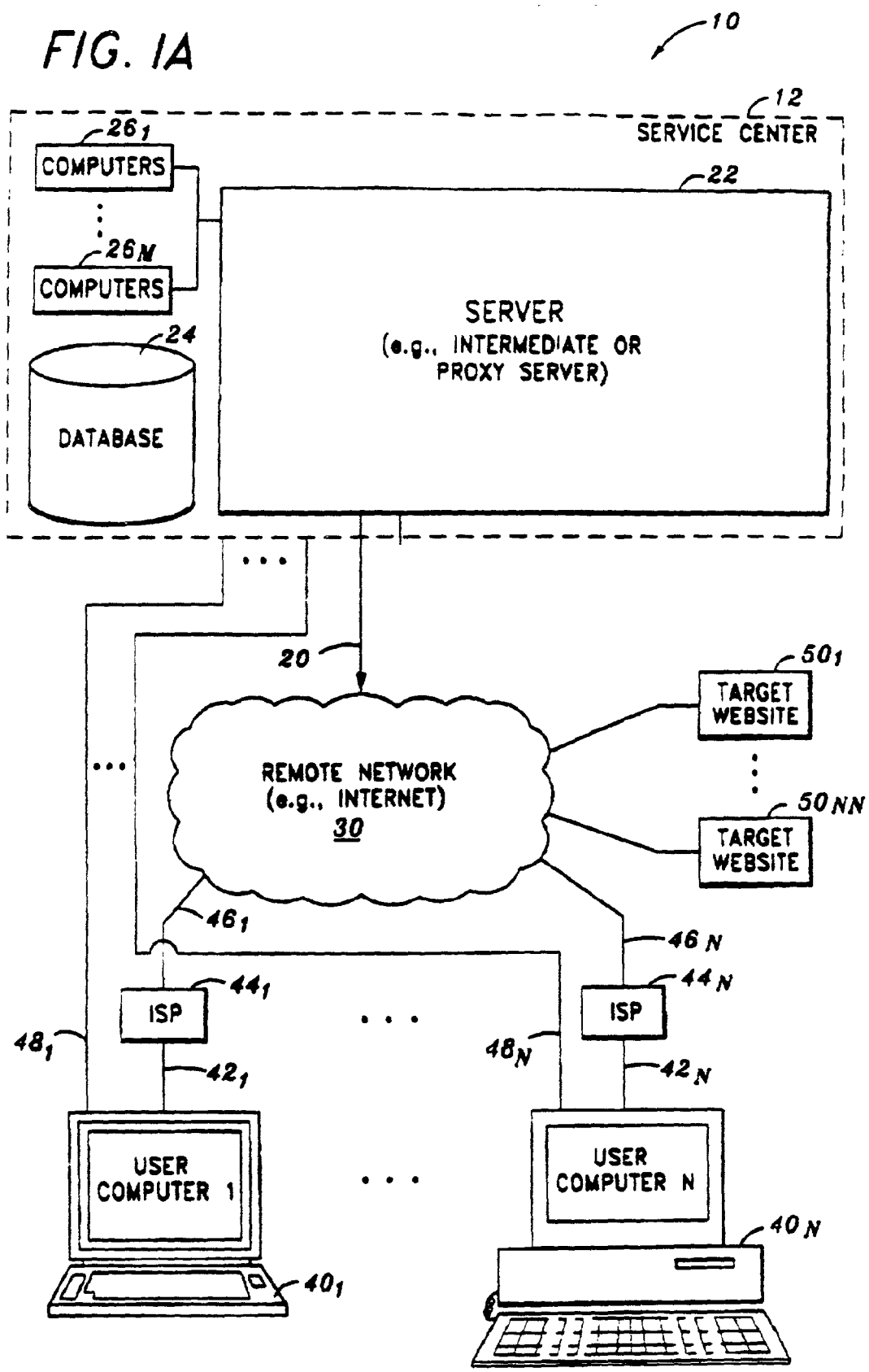
FIG. 1A is a system block diagram of one embodiment of a network system in which the system and method of the invention may be implemented.

One aspect of the present invention relates to a system and method for monitoring and analyzing communications provided to a software application. These communications may be digital, and may also be text-based communications. In one embodiment, a user interacts with an external software application through a graphical user interface viewable on a display screen. The user may provide a text-based communication to an external software application which, in turn, provides the communication to a software module capable of performing one aspect of the present invention.

In another embodiment, the external application is capable of converting audible communication to a digital communication using voice recognition technology, where a digital version of the communication is then provided to the software module for analysis. Along with providing the communication, the external application may also provide user-specific information to the software module identifying the user. In a further embodiment, the software module processes the information provided to it and returns a result to the external application. The external application may then use this result to modify its interaction with the user.

In one embodiment, the result provided by the software module can also be correlated to a color scheme that is displayed during real-time communication. In one embodiment, conversations having normal content are correlated with the color green. As the conversation involves more questionable content, the color being displayed for the given conversation may change to yellow, then to orange and so on. In one embodiment, the colors being correlated to text-based conversations are displayed to an individual monitoring a plurality of communications. In this manner, a multitude of text-based conversations can be monitored and managed by a single individual in real-time.

The present invention may be implemented in various devices such as telephones, computers and magnetic tape recorders. When implemented as software, the present invention may be implemented in combination with other software.

Definitions

As discussed herein, a "computer system" is a product including circuitry capable of processing data. The computer system may include, but is not limited to, general-purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. Content refers to application programs, driver programs, utility programs, file, payload, etc., and combinations thereof, as well as graphics, informational material (articles, stock quotes, etc.) and the like, either singly or in any combination. A "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

System Overview

A description of an exemplary system, which incorporates embodiments of the present invention, is herein described. FIG. 1A shows a system block diagram of one embodiment of a network system 10 in which the apparatus and method of the invention is used. Referring to FIG. 1A, the network system 10 comprises a service center 12 that is connected over one or more communication links 20 to a remote network 30 (e.g., a wide area network or the Internet) or a remote site (e.g., a satellite, which is not shown in FIG. 1A) to one or more user computer systems $40_1$–$40_N$ ("40"). In one embodiment the service center 12 is a website. The service center 12 includes one or more servers 22 and one or more databases 24. In one embodiment, the server 22 includes software modules for performing the processes of the invention, as described in detail in the following sections. In another embodiment, user computer systems 40 include software modules for performing the processes of the present invention. In yet another embodiment, a target website 50 includes at least one software module for performing the processes of the present invention.

The service center 12 may include one or more computers $26_1$–$26_M$. If a plurality of computers are used, then the computers $26_1$–$26_M$ may be connected by a local area network (LAN) or any other similar connection technology. However, it is also possible for the service center 12 to have other configurations. For example, a smaller number of larger computers (i.e. a few mainframe, mini, etc. computers) with a number of internal programs or processes running on the larger computers capable of establishing communication links to the user computers.

The remote network 30 or remote site allows the service center 12 to provide information and services to the user computers $40_1$–$40_N$, using software that is stored at the service center 12. The one or more databases 24 connected to the service center computer(s), e.g., computer $26_1$, may be used to store data and software used to carry out the present invention. Each user computer $40_1$–$40_N$ is connected over a corresponding communication link $42_1$–$42_N$ such as a local carrier exchange to a respective ISP $44_1$–$44_N$, through which access to the remote network 30 is made. By inputting the URL address of the target website with which the user desires to interact, the user may be connected to various target websites, such as websites $50_1$–$50_{NN}$. In an alternate embodiment, each user may be connected over a corresponding communication link $48_1$–$48_N$ to the service center 12, which provides Internet access and service to the user computer(s) 40. In a further embodiment, the display screen for viewing the presentation may be located on a television coupled to the network 30. For example, the end user may be a viewer of a set top box television. In this case, navigation through the presentation may be provided using control buttons on a remote control unit for controlling viewing of the television, or by other means known in the art.

One aspect of the present invention relates to the use of one or more software modules to monitor and analyze text communications over one or more communication links 20 to a remote network 30. Such software modules may be developed on a computer system that is separate and apart from the service center 12, or may be developed using one of the computers $26_1$–$26_M$. Upon completion of the development process, the one or more software modules may be stored in the database 24. Alternatively, the one or more software modules may be stored on a machine-readable medium.

In one embodiment, the service center 12 that is connected over one or more communication links 20 to a remote network 30 (such as the internet) may be requested to monitor and analyze communications between two or more user computer systems 40 or between one or more user computer systems 40 and one or more target websites 50. In this embodiment, the software modules to carry out the present invention could be stored on the database 24. Digital communications, which may be monitored and analyzed according to one aspect of the present invention, include emails sent through server 22, messages posted to an electronic bulletin board which is stored on or otherwise accesses the server 22. In addition, textual messages sent in online chat rooms which are processed by server 22 may also be monitored and analyzed for unusual or abnormal content.

In an alternate embodiment, a software module to perform the process of the current invention may be located on user computer systems 40. In this embodiment, the software module on the user computer system 40 may monitor and analyze those textual communications originating from and targeted to that particular user computer system 40. The one or more software modules may be integrated in or merely accessed by an email client, chat client, parental monitoring system, Internet browser or other software application capable of processing textual communications.

In another embodiment, the software module to perform the present invention may be located on target website 50. In this embodiment, the software module analyzes and monitors text communications passing through or stored on the target website 50. By way of a non-limiting example, in this embodiment, the software module may be integrated in or accessed by an email server, chat server or electronic bulletin board module.

Figure 1B:
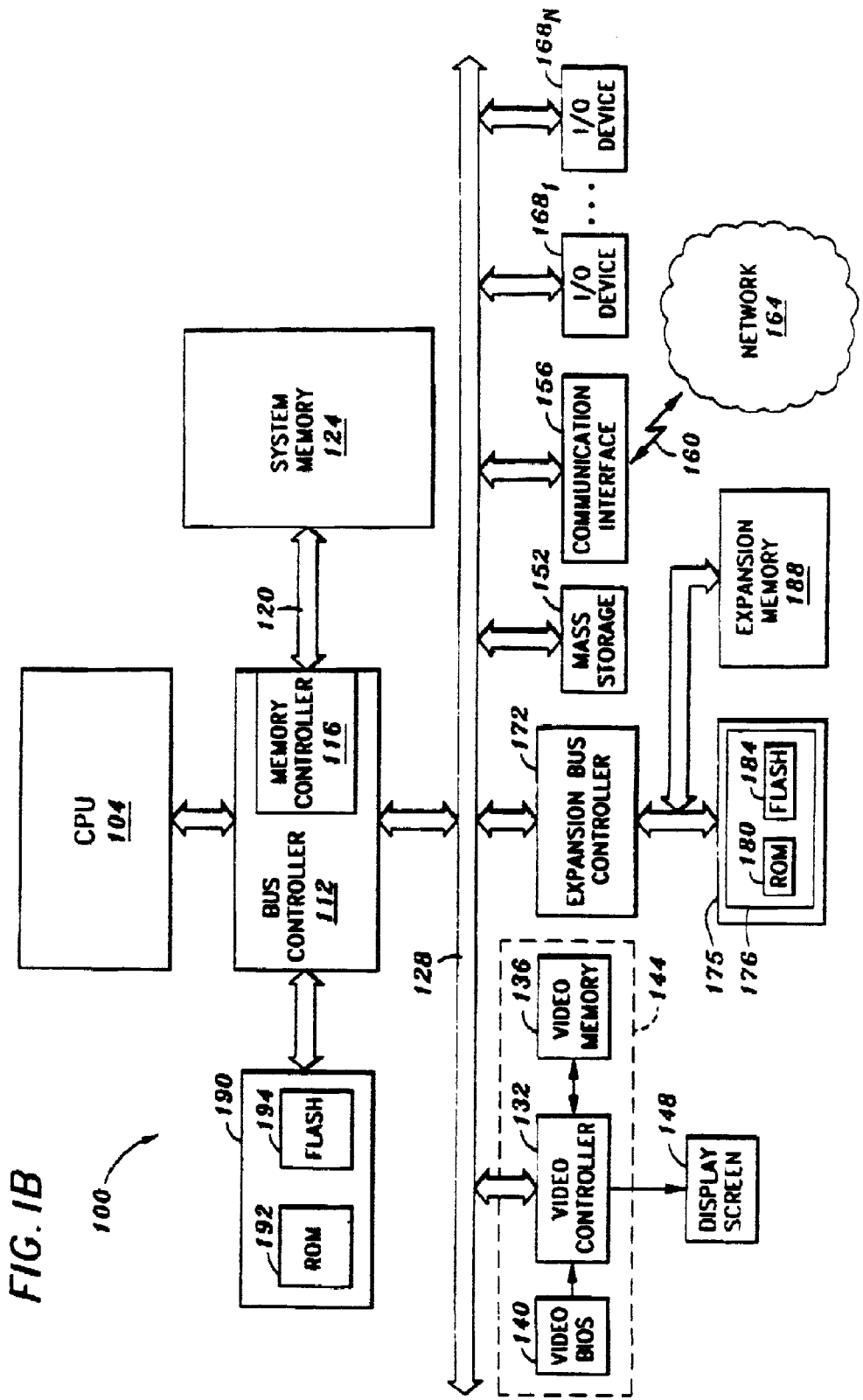
FIG. 1B is a system block diagram of one embodiment of a computer system, which implements the embodiments of the invention.

Referring to FIG. 1B, the computer system 100 (representing either of computer 26 or 40) comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high-speed memory device or memory circuitry. The bus controller 112 is coupled to a system bus 128 that may be a Peripheral Component Interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be disk drive, such as a compact disk drive, a digital disk drive, a tape drive, a zip drive, a jazz drive, a digital video disk (DVD) drive, a magneto-optical disk drive, a high density floppy drive, a high capacity removable media drive, a low capacity media device, and/or any combination thereof. The expansion bus controller 172 is coupled to non-volatile memory 175, which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188a having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

The present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" or "machine readable medium" may include any medium that can store information. Examples of the processor readable medium include an electronic circuit, a semiconductor memory device, a ROM, a flash memory, an erasable ROM (EROM), a floppy diskette, a CD ROM, an optical disk, a hard disk, etc. The computer data signal may include any signal that can propagate over a transmission medium such as electronic network channels, optical fibers, air, electromagnetic, RE links, etc. The code segments may be downloaded via computer networks such as the Internet, Intranet, etc.

Figure 2:
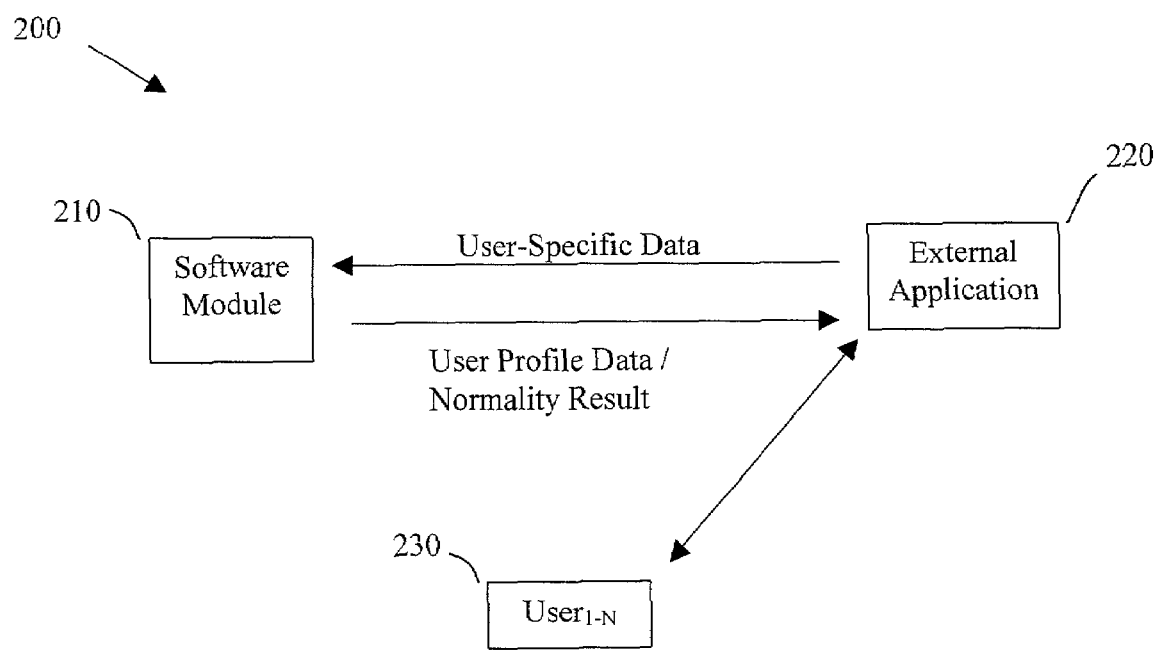
FIG. 2 depicts one embodiment of how a user may interact with the one aspect of the present invention.

Referring now to FIG. 2, one embodiment of the present invention involves providing at least one software module 210 which is capable of interacting with an external software application 220, which is in turn interacting with one or more users 230. In one embodiment, user 230 interacts with the external application through a graphical user interface viewable on a display screen. While the software module 210 may consist of stand-alone executable software code, it may also be comprised of one or more dynamically linked libraries which is accessed by external application 220.

In one embodiment, the external application 220 is a chat server running on target website 50 or, alternatively, on server 22. In such a case, a user 230 may interact with the external application over network 30 through a graphical user interface on a display screen. In another embodiment, external application may be an email client being executed on a user computer 40. In yet another embodiment, the external application 220 is a parental control program running on a user computer 40, target website 50 or server 22. Where the external application is being executed at either server 22 or target website 50, user 230 may interact with it over network 30 or communication link 48 through a graphical user interface viewable on a display screen.

In another embodiment, rather than the user interacting with the external application 220 via a graphical user interface, the user may provide audible communications to the external application 220, after which the audible communication is converted to a text-based communication using voice recognition technology, as is commonly understood by those in the art. Where the user is providing audible rather than text-based communications, the external application 220 may be connected to a communication device, such as a telephone. The external application 220 may then capture the audible communication and transform it into a digital text-based format. Thereafter, the text-based format may be made available to the software module 210 for analysis consistent with the present invention. In one embodiment, the external application 220 is a voice recognition program. In another embodiment, a voice-recognition add-on software module is used in conjunction with the external application 220.

It should be appreciated that any form of analog communication which may be converted into a digital format may be analyzed by software module 220, subsequent to such conversion. Similarly, while the discussion herein is directly generally to text-based communications, any digital communication (or communication converted into digital format), may be supplied to software module 220 and analyzed according the present invention. Methods of conversion may include the use of analog-to-digital converters or, may also be comprised of methods of digitizing voice patterns through voice recognition technology, as is known by one of skill in the art.

The software module 210 may be located at server 22, target website 50 or user computer 40. Where the software module 210 is located remotely from the external application 220, communication between the software module 210 and the external application 220 may be over the network 30. In yet another embodiment, target website 50 may be run from a third-party server (not shown). In turn, the third-party server may desire to access software module 210 where it is located on server 22. In such a case, third-party server may also utilize network 30 to connect to software module 210 located on server 22. Similarly, a series of third-party servers may be connected over network 30, where the series of servers access each other as a means of accessing the function served by software module 210.

One aspect of the present invention involves having the external application 220 provide user-specific information to the software module 210 and, in turn, having the software module 210 provide the external application 220 with user profile data. In one embodiment, the user-specific information provided by the external application 220 consists of textual messages that the user has made available to the external application 220 through a graphical user interface. The user may make such text available, for example, by entering text at user computer 40, where user computer 40 is executing the external application 220. Alternatively, a user may transmit text to the external application 220 over network 30 or communication link 48. In addition to textual messages, the user-specific information may consist of user identification data. Such user identification data may include identity-based information which may be used to establish a relationship between a communication and the user who provided it. In addition, the user-specific information may include user profile data, where the user profile data reflects the nature of previous messages provided by the user and the likelihood that those communications relate to a predetermined subject.

Once the user-specific information is provided to the software module 210 by the external application 220, the software module 210 processes the information and provide a result back to the external application 220. In one embodiment, this result includes updated user profile data which the external application 220 uses to manage its interaction with the user 230. For example, external application 220 may use the result provided by the software module 210 to limit a particular user's ability to continue to provide the external application 220 with information. Where the external application 220 is an online chat server, for example, the chat server may provide various textual messages to the software module 210. Software module 210, in turn, provides an updated user profile to the chat server, where the update reflects an analysis of the text messages the user 230 has previously entered. Based on this updated user profile data, the chat server may then make a determination that a user's 230 ability to continue to provide textual messages to the chat server should be either limited or terminated. In another embodiment, the user profile data is a normality result which is indicative of the content of the text communication provided by the user.

Figure 3:
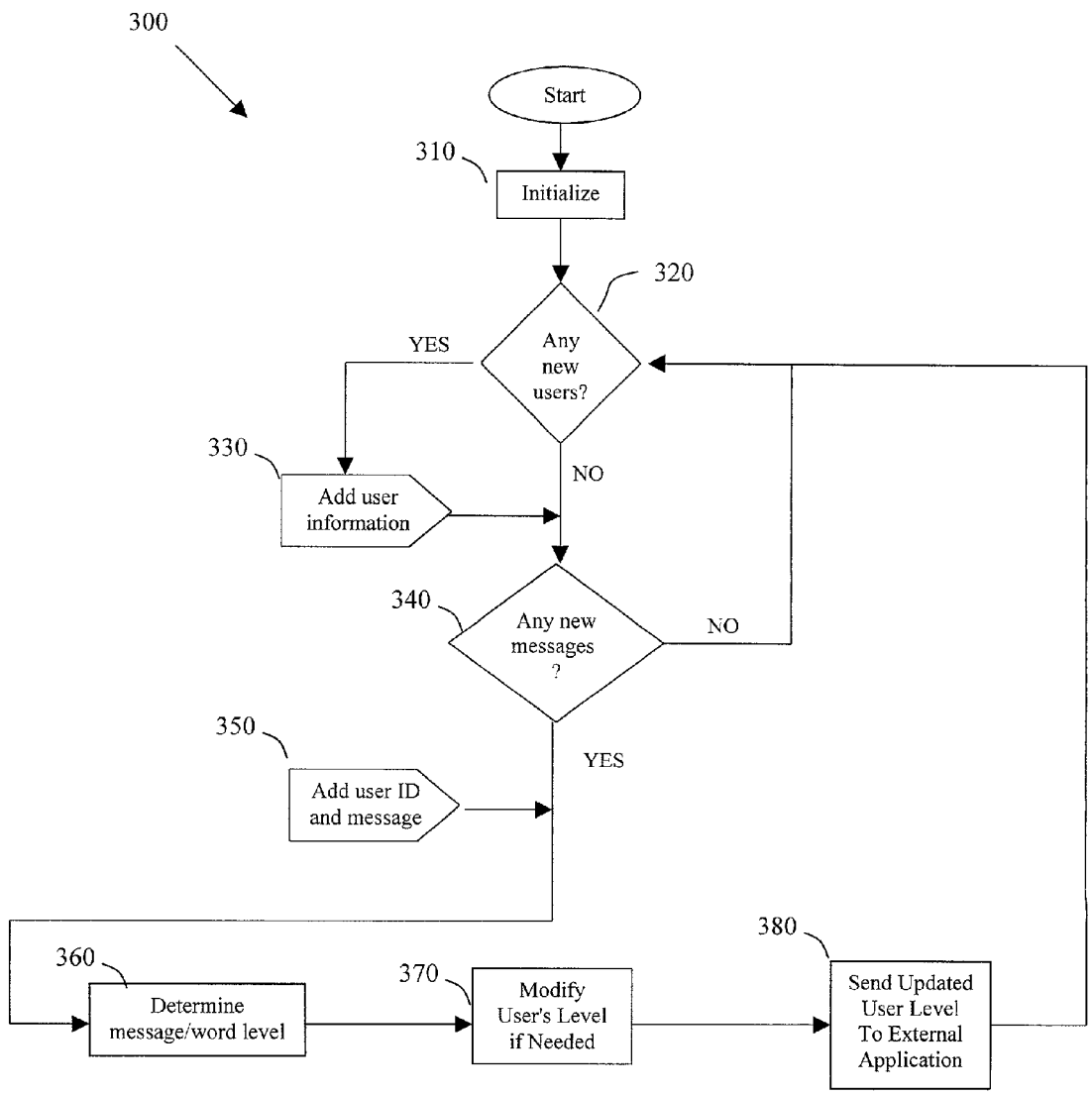
FIG. 3 illustrates one embodiment of a flow diagram of the interaction between the software module and an external application, provided in accordance with the principles of the invention.

Referring now to FIG. 3, process 300 describes the interaction between the software module 210 and the external application, according to one embodiment. Process 300 begins with the initialization of the software module 210. As discussed previously, the software module may be located on server 22, target website 50 or user computer 40. Where, for example, the software module 210 is located on user computer 40, initialization occurs upon the start of an initialization event, which may consist of a monitoring request issued by the external application 220. It is understood to one of ordinary skill in the art that other methods of triggering initialization may be implemented and substituted herein, to be consistent with the teachings of the invention.

At decision block 320, process 300 poles the external application 220 for information regarding the existence of new users 230. Where the external application 220 returns a non-null value, such user information is maintained at block 330. As soon as the software module 210 has received and stored at least one non-null value relating to the presence of a user, process 300 proceeds to decision block 340 where it polls the external application 220 for the occurrence of any textual messages. Where none are found, process 300 maintains loop 320–340 pursuant to which the existence of information relating to both new users and new messages is polled.

Where the external application 220 returns a non-null value for the poling of block 340, process 300 then proceeds to block 340, at which point the software module 210 accepts a digital message and any corresponding user-specific information provided by the external application 220. Process 300 proceeds to block 360 where, as described in more detail below, a determination is made as to the normality or desirability of the message or message components received and stored at block 350. In one embodiment, the normality or desirability of a message is negatively affected where the content of the message is sexually oriented, violent in nature or otherwise considered inappropriate for children to view. In another embodiment, the normality or desirability of a message may depend on content which relates to espionage, racism, or terrorism. It should further be appreciated that any number of subjects, issues, behavior or propensities may be targeted. For example, in one embodiment, message content relating to particular commercial products may be identified and the normality or desirability of a message adjusted accordingly. By way of a non-limiting example, a manufacturer may want to gauge the level of consumer satisfaction by monitoring messages posted to an online electronic bulletin board. In such a case, the normality or desirability of the content of such messages may be affected by the level of satisfaction being reported by users posting messages. Although some aspects of the present invention have been described herein as being directed to particular categories of content, the present invention is not be limited to, nor dependent on, any particular type of text-based communication.

Based on the determination at block 360, the software module 210 may alter information relating to a user's profile at block 370. As discussed below, in one embodiment this user profile consists of a user level. Finally, at block 380, the software module 210 provides the updated user profile information, or result from block 370, to the external application (block 380). In one embodiment, an updated user level is provided to the external application 220 at block 380.

As mentioned above, in one embodiment the software module 210 may assign and alter user levels depending on the content of the textual communications they supply to the external application 220 and which is subsequently made available to the software module 210. For example, as the communications being provided by a user 230 begin to take on an abnormal or undesirable nature, the software module 210 makes a determination as to whether the user 230 should be moved to a higher level. By having the software module 210 reduce the nature of the user's messages to a single indicator (e.g., level or normality result), the external application 220 is able to easily manage the user's ability to continue interacting with the external application 220.

Likewise, the user may supply voice or audible messages, rather than text-based messages. In such an embodiment, the supplied audio message must first be converted to a digital format as discussed above (e.g., through voice recognition software). As with text-based messages, converted audible communications may then be supplied to the software module 210 which, in turn, may assign and alter user levels depending on the content of such audible communications.

In one embodiment, the nature of the user's messages may be reduced to a particular hue among a plurality of colors in a predetermined color scheme. For example, a normality result returned by the software module showing the content of a message to be normal may be correlated with the color green. In another embodiment it is correlated with the color white. As the messages being provided by user 230 begin to take on a more dubious nature, the color assigned to the normality result may be yellow. Thereafter, the color orange may be associated with the next higher level of the normality result. In one embodiment, the color scheme is displayed to an individual monitoring a plurality of users 230. It is understood that other color variations may be used to denote the various normality results or levels of conversation.

As discussed in more detail below, the color displayed for a given user 230 may be correlated to a level assigned to the user 230. In this manner, a single individual may monitor a plurality of users' activities.

Figures 4, 5:
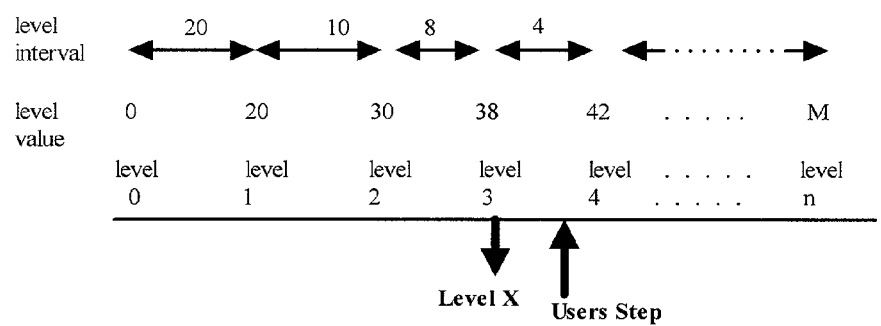
FIG. 4 illustrates one embodiment of a user value assignment process provided in accordance with the principles of the invention.
FIG. 5 illustrates one example of an entry in a dictionary database provided in accordance with the principles of the invention.

One embodiment of how user levels are calculated and what criteria are used to change them is illustrated in FIG. 4. In particular, each level is numbered using integers 0 through n. The term 'User Level' will be used to denote the current level (0–n) which is being reported by the software module 210 as being the user's current level. Moreover, each level is divided into a number of increments referred to herein as "Level Intervals," where the Level Interval coincides with the number of times a user may be reported as being in a given level before the user is moved to the next higher level. For example, referring to FIG. 4, we see that a user may only be in level 1 a total of 10 times before they are moved up to level 2. Moreover, within each level (0–n), there is a range of "Level Values" which increment along the same scale as the Level Intervals. For example, from FIG. 4 we see that Level Values 0–20 are associated with level 0, whereas Level Values 21–30 may be associated with level 1. In addition, the term "User Detail Level" or "User Detail Level" is used to refer to the specific Level Interval the user has obtained. The manner in which a user's User Detail Level is adjusted is described in detail below. When a user's User Detail Level exceeds the Level Interval for the user's current User Level, the user is advanced to the next higher level, according to one embodiment.

Referring again to FIG. 4, the User Detail Level shown reflects the fact that the user is in level 3 and has obtained a User Detail Level of approximately 3. Moreover, "Level X" will be used to refer to a predetermined level which coincides with what is considered to be a normal level of communication or conversation.

As used herein, "Word Value" refers to a value assigned to a particular word which is indicative of the likelihood that the message in which it is used is of an abnormal or undesirable nature. By way of illustration, the word 'sun' would be assigned a lower Word Value than the word 'gun.' Word Values may be stored in a "dictionary." The word dictionary may be contained in a database which is part of the software module 210 or alternatively, may be stored as a database which is accessed by the software module 210. Stored values relating to specific words housed in a database may be referred to herein as a "dictionary." Each word assigned a Word Value is also given a "Repeated Index." The Repeated Index of a given word represents the number of times words having Repeated Indices equal to or less than the Repeated Index of the given word must appear in a sentence before its Word Value is included in the calculation of the value of the sentence.

By way of illustration, assume the sentence "I want to see you" is provided to the software module 210 by the external application 220. Further assume that the words "I", "want" and "you" all have a Repeated Index of 3. In such a case, since there are at least 3 words having a Repeated Index of 3 or less, the Word Values for all three words will be counted towards the value of the sentence. Now assume that the word "I" has a Repeated Index of 4, while the Repeated Indices of the other two words remain the same. In this case, none of the words will be counted towards the value of the sentence since the minimum 3 words having Repeated Indices of 3 or less has not been satisfied. It should be appreciated that, although Repeated Indices have been described herein as being applied on a sentence-by-sentence basis, another embodiment would apply the Repeated Index criteria across a segment of a sentence or across a number of multiple sentences. For example, one embodiment may apply the Repeated Index criteria to each grouping of ten words. Alternatively, the Repeated Index criteria may be applied across two full sentences where at least one of the sentences contains less than four words. Thus, one aspect of the present invention is to use the Repeated Index to enable the identification of sentences and/or messages which are most likely to contain abnormal material. In particular, the use of the concept of a Repeated Index enables a words to be assigned 'effective' values depending on the context in which a word is being used.

In addition to having a Word Value and Repeated Index, each word is also assigned a level, referred to herein as "Word Level." In one embodiment, the Word Level is stored in a dictionary, along with the Word Value and Repeated Index. As with the Repeated Index, the function of the Word Value is to connect the context in which the word is being used to the particular word. In particular, in one embodiment a word is only used in the calculation of the value of a sentence where the Word Value for the given word is equal to or less than the current User Level.

By way of illustration, assume the words used in our previous hypothetical (e.g., "I", "want" and "you") are all in level 1. Where the user is in level 0 (User Level=0), none of these words would be included in the calculation of the value of the sentence "I want to meet you." Alternatively, assume that the user is in level 1 (User Level=1), in this case all of the words would be used in calculating the value of the sentence (assuming their Repeated Index criteria is also satisfied).

Referring now to FIG. 5, one entry in a dictionary accessible to the software module 210 is depicted. In this entry, the word "sex" has been assigned to level 0, having a Repeat Index of 1 and a Word Value of 10. Thus, a software module 210 implementing the present invention according to this embodiment, would include a Word Value of 10 in the calculation of the value of the sentence in which it is being used regardless of the user's level or the nature of the other words used in the sentence. This is due to the fact that, in this case, the User Level will never be less than the Word Level (Word Level of "sex"=0). Moreover, the Repeated Index criteria will never preclude the inclusion of this word in the sentence value calculation since, at a Repeated Index of 1, the criteria is satisfied as soon as the word itself is used in a message. If, on the other hand, the Repeated Index for the word "sex" had been set to 2, then it's Word Value would only have been included in the calculation of the sentence value if there were at least one other word having a Repeated Index of 1 or greater.

Prior to providing updated profile data or a normality result to the external application 220, the software will need to analyze a segment of a message which the user has provided to the external application 220. For simplicity, this segment may be referred to as a sentence. Such an analysis begins by calculating a value for a sentence according to the following expression:

$$SentenceValue = \sum_{j=1}^{j=I} (N_j)/I \quad (1)$$

where
N=Word Value for word j;
j ranges from 1 to the number of counted word in a sentence; and,
I ranges from 1 to j.

In one embodiment, equation 1 is used to calculate the value of a sentence by first ordering the words to be counted in order of descending Word Value. Thus, $N_1$ would coincide with the Word Value for the word with the highest Word Value of all of the counted words. By way of example, assume equation 1 will be used to calculate the sentence value for the sentence "I want to see you." Further assume that the words used in that sentence have the following word values associated with them: "I"=5, "want"=6, "see"=7, and "you"=4. To apply equation 1 to this sentence, you would first order the sentence according to descending Word Value. Each Word Value would then be divided by the number of words which have been counted to that point. The sum of these quotients would then be determined and used as the value for that sentence. This expression may be represented as follows:

$$SentenceValue = \sum \left(\frac{7}{1} + \frac{6}{2} + \frac{5}{3} + \frac{4}{4}\right)$$

As mentioned above, although equation 1 has been described as calculating the value for a sentence, it should be appreciated that any other unit of conversation may be used. For example, the value of two sentences may be reported to the external application 220 or, alternatively, a single message, regardless of the number of sentences it contains, may be reported to the external application 220. The unit of conversation to be processed may be determined separate from software module 210 or external application 220. For example, a separate software module, or add-on, may be employed to divide text-based communications into predetermined units of conversation having a particular length. In one embodiment, this add-on is a supplemental software module to the external application which, once a unit of conversation has been obtained, provides such unit to software module 210.

As mentioned above, the value of the Level Interval for each level is a dynamic number. In one embodiment, the Level Interval is a function of a predetermined Sensitivity Index. In this embodiment, the computation of Level Intervals may proceeds according to the following expression:

$$LevelInterval = \sum_{1}^{j} \left(N_j - \left[\frac{N_{j-1}}{S}\right]\right) \quad (2)$$

where,
j=number of levels counted, where j ranges from 1 to the total number of possible levels;
N=magnitude of the Level Interval for level j, where the value for level 1 is a predetermined value and $N_0=0$; and
S=Sensitivity Index, where the Sensitivity Index is a predetermined integer.

By way of a non-limiting example in applying Equation 2, if the Level Interval for level 1 is set at 20 and S=3, the Level Intervals are as follows:
Level 0–1: 20–[0/3]=20–0=20
Level 1–2: 20–[20/3]=20–7*=13
Level 2–3: 13–[13/3]=13–4*=9
Level 3–4: 9–[9/3]=9–3=6 etc.,
* Values rounded to nearest integer Thus, by using Equation 2 the pace with which a user is moved up or down the through the levels may be adjusted by changing the value of S. It should further be appreciated that $N_1$ may be set to any predetermined value.

Figure 6:
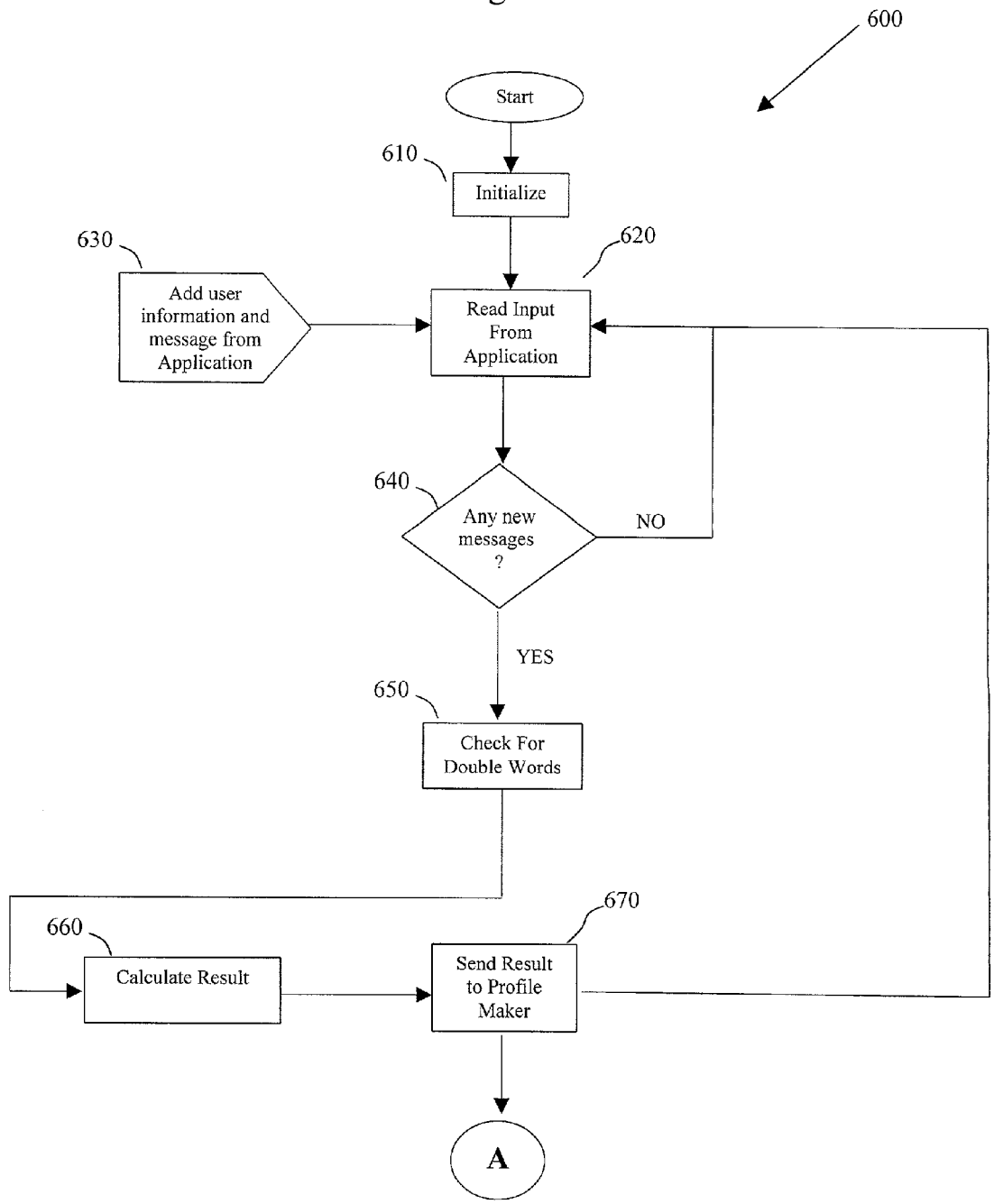
FIG. 6 illustrates one embodiment of a process flow for monitoring and analyzing textual communications provided in accordance with the principles of the invention.

FIG. 6 illustrates one embodiment of a process 600 for monitoring and analyzing textual communications according to the principles of the present invention. Software to perform particular aspects of the process is first initialized at block 610. In one embodiment, the software module 210 is initialized at block 610. Information provided by an application is then accepted at block 620. In one embodiment, this information is provided by the external application 220 and is in the form of user-specific information. As discussed earlier, such user-specific information may be in the form of text-based communications that the user provides to the external application 220 or user identification data.

The input read at block 620 may be the result of the software module 210 polling the external application, or alternatively, may be affirmatively provided by the external application 220 to a software module 210 programmed to be idle until such input is received.

At decision block 640, a determination is made as to whether any text communication data has been provided to the software module 640. Where a message has been provided for analysis, the process 600 first checks for and corrects the occurrence of double words at block 650. At block 660, a normality result is calculated according to a method consistent with the present invention. In one embodiment, the normality result coincides with the sentence value calculated using Equation 1. However, it is understood that other measures of the normality or desirability of the message or sentence may be used where consistent with the teachings of the present invention.

Figure 7:
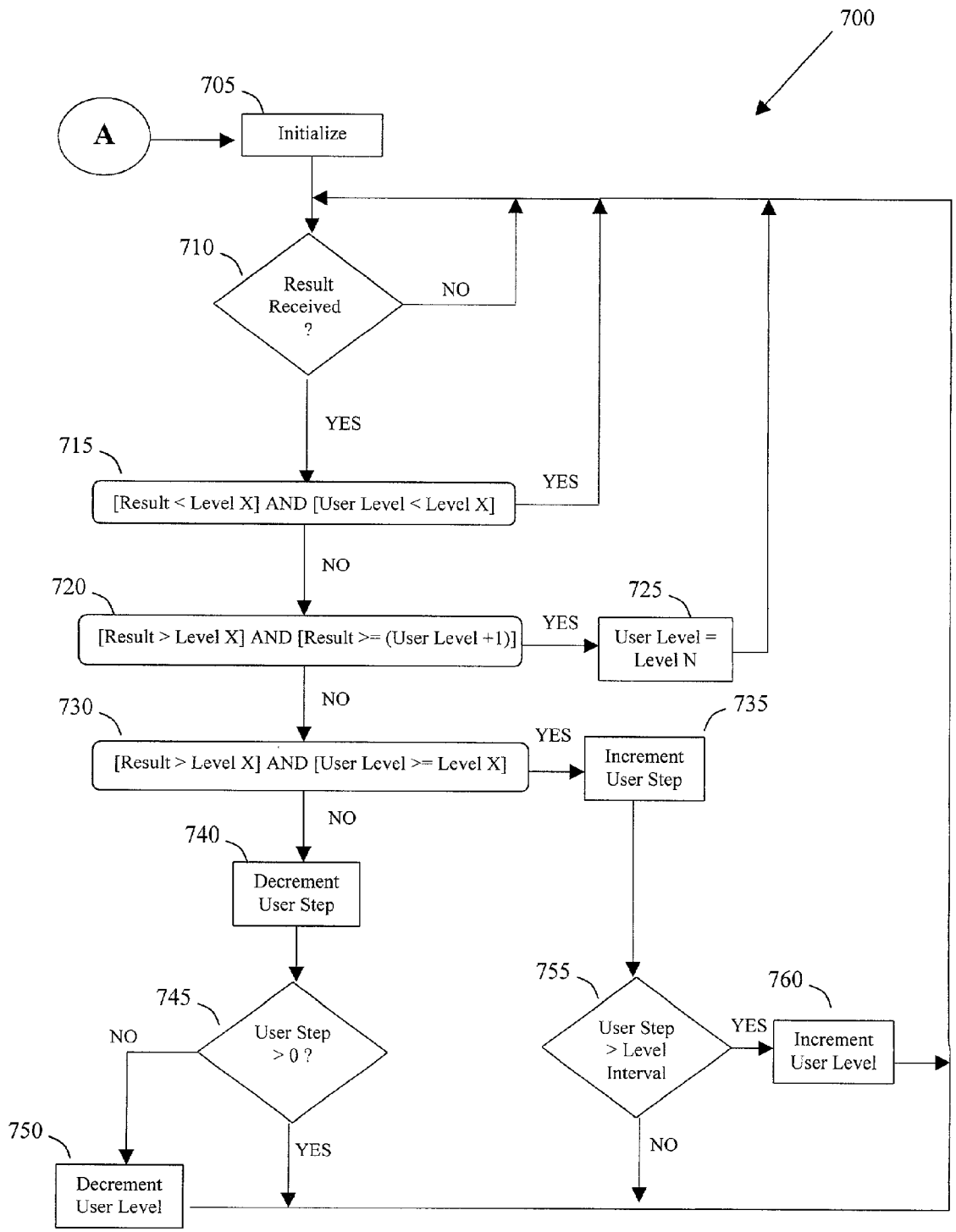
FIG. 7 illustrates one embodiment of a profiling process provided in accordance with the principles of the invention.

Referring now to FIG. 7, once a normality result has been calculated it may be sent to the profiler 700, according to one embodiment. In this embodiment, the profiler 700 represents a portion of the function software module 210 performs. In particular, profiler 700 provides the external application 220 with updated user profile data such that the external application 220 may then adjust the user's ability to continue to interact with the external application 220. Moreover, in this embodiment, given that the result received at block 710 is to be compared with the User Level and Level X, it will be necessary to normalize the result received at block 710 to coincide with the same scale on which the User Level and Level X exist. It should further be appreciated that, while not depicted in FIG. 7, instead of adjusting he normality result (block 710), the measures of User Level (currently 0–n) and Level X may be normalized for proper comparison. For simplicity, the result provided to the profile maker 700 at block 710, while be referred to herein as the "710 Result."

Profiler 700 is initialized at block 705 and remains idle until decision block 710 returns a non-null value. At block 715, profiler 700 first makes a determination as to whether the Result is less than Level X and the User Level is less than Level X (recall that Level X is an arbitrarily chosen level which coincides with what is considered a normal level of conversation). Where this inquiry returns a value of 'true,' the user profile information is not adjusted and profiler returns to wait for the next 710 Result. However, where a value of 'false' is returned at block 715, profile maker 700 proceeds to block 720.

At block 720, a determination is made as to whether the 710 Result is higher than Level X and the 710 Result is not less than the User Level plus 1. Where this inquiry returns a value of 'true', the User Level is adjusted to equal "Level N", where Level N is the level which corresponds to the normalized value of the 710 Result. By way of example, suppose the User Level is 1, meaning the user is currently in level 1 and Level X has been preset to 2. In setting Level X to 2, a determination has been made that level 2 coincides with a normal conversation or message. Now suppose the 710 Result, after normalization, returns a value corresponding to level 3. In this case, the inquiry at block 720 would return value of 'true' since the 710 Result is both greater than Level X (i.e., 3>2) and greater than or equal to the User Level plus 1 (i.e., $3 \geq (1+1)$). Where a value of 'true' is returned at block 720, the User Level is incremented to Level N. On the other hand, where a determination having a 'false' value is made, profiler 700 proceeds to block 730.

At block 730, a determination is made as to whether the 710 Result is greater than Level X and the User Level is greater than or equal to Level X. Where this is true, the User Detail Level is incremented by one at block 735. Thereafter, a determination is made at block 755 as to whether the User Detail Level is greater than the Interval Level. If so, the User Level is incremented at block 760 and profiler 700 returns to an idle position until the next 710 Result is received. In one embodiment the User Detail Level is set to 1, to coincide with the number of times the user has been in the new level to which the user was promoted at block 760. On the other hand, where the inquiry at block 730 returns a value of 'false' the User Detail Level is decremented by one. Thereafter, at decision block 745 a determination is made as to whether the User Detail Level is above 0. If so, profile maker 700 returns to an idle position until the next 710 Result is received. However, if the User Detail Level is below 0 (i.e. a negative value), then the User Level is decremented by 1. In one embodiment, the User Detail Level is set to the highest Level Interval for the new level to which the user was just demoted at block 750. For example, referring back to FIG. 4, a user having a User Level of 2 and a negative User Detail Level, will be demoted to User Level 1 and have their User Detail Level set to 19. In another embodiment, rather than being set to the highest Level Interval of the new lower level, the User Detail Level may be set to 0. Thus, in this latter embodiment, once a user is demoted to User Level 1, the user would have to be in level 1 twenty times before being promoted back up to User Level 2.

As discussed above, one aspect of the present invention is to convert the normality result to a color which is correlated to the level of the message and/or the User Level. In one embodiment, a color scheme containing the colors white, green, yellow, orange and red is correlated to User levels 0 through 4. In another embodiment, various shades of yellow, orange and red may be used to represent more User Levels. It should be appreciated that the colors may be correlated, not to the User Level, but to the sentence/message value.

In yet another embodiment, the colors correlated to User Level are displayed to an individual performing a monitoring function, where the individual may be monitoring a plurality of users. For example, a individual performing a monitoring function may use a display screen capable of displaying a plurality of instances of a color scheme. Each instance of a color scheme may then be correlated to the activities of a particular user interacting with the external application 230. As an instance of a color scheme begins to move from white to green to yellow, the monitor is able to make a determination as to whether the activities of the given user should be curtailed. For example, the monitor may temporarily or permanently terminate the user's ability to continue to interact the external application.

Rather than a display screen, colors may be provided to an individual performing a monitoring function in the form of a series of colored lights which are lit in response to the level of concern or abnormality of a message provided by a user. In addition, the colored lights may be lit in response to the User Level of given user providing text-based communications to the external application 230.

It should further be appreciated that, although colors have been described herein as being correlated to either User Level or sentence/message value, it would also be consistent with the teachings of the present invention to use a pattern scheme or other graphical depiction capable of conveying to a individual the level of the message or conversation to which the graphical depiction is correlated.

Although the present invention has been described in terms of certain preferred embodiments, other embodiments apparent to those of ordinary skill in the art are also within the scope of this invention. Accordingly, the scope of the invention is intended to be defined only by the claims, which follow.

The invention claimed is:

1. A method for monitoring electronic communications, comprising:
   receiving a message containing one or more words provided by a user to a software application during an electronic communication;
   accessing at least a portion of said message using a software module;
   generating user profile data, said user profile data to identify said user, said user profile data corresponding to at least one previous message provided by the user;
   generating a result indicative of the likelihood that said message relates to a predetermined subject;
   updating the user profile data with said result;
   assigning a user level to said user, said user level to be a function of one or more previous messages the user has provided to the software application, said user level to vary as the likelihood that said previous messages relate to the predetermined subject;
   assigning word values to each of the one or more words contained in the message, said word values to be a function of the likelihood that the one or more words to which said word values are assigned relate to the predetermined subject;
   assigning word levels to each of the one or more words contained in the message, said word levels to be a function of the likelihood that the one or more words to which said word levels are assigned relate to the predetermined subject;
   assigning repeated indices to each of the one or more words contained in the message; and
   determining a set of counted words, said set of counted words corresponding to the word levels and repeated indices for the one or more words in said message, said set of counted words to further correspond to said user level.

2. The method of claim 1, further comprising sending said updated user profile date to the software application.

3. The method of claim 1, wherein receiving the message containing one or more words provided by the user comprises receiving a text message which has been entered into a computer by said user.

4. The method of claim 1, wherein receiving the message containing one or more words provided by the user comprises receiving the message where said message has been posted to an electronic bulletin board, said electronic bulletin board capable of being accessed over a network by one or more users.

5. The method of claim 1, wherein receiving the message containing one or more words provided by the user comprises receiving the message provided by the user to the software application, where the software application is one of the following: an e-mail application, an online chat server application, an electronic bulletin board application, a network browser application, and a parental monitoring system application.

6. The method of claim 1, wherein accessing at least a portion of the message using the software module comprises transmitting a segment of the message to the software module over a network, said segment having a predetermined length.

7. The method of claim 6, wherein accessing at least a portion of the message using the software module comprises transmitting the segment of the message to the software module over a network, said segment being determined by an add-on module associated with the software application according to said predetermined length.

8. The method of claim 1, wherein generating user profile data comprises sending said user profile to said software module, sending information relating to the user's identity and sending a user level, said user level corresponding to a likelihood that the user has provided communications relating to the predetermined subject.

9. The method of claim 1, wherein generating the result indicative of the likelihood that said message relates to the predetermined subject comprises having the software module generating a result indicative of the likelihood that said message relates to the predetermined subject, said software module to further update the user profile data using said result, said software module to send the updated user profile data to the software application, said software application to alter the user's ability to continue to provide messages as a function of the updated user profile data.

10. The method of claim 1, wherein receiving the message containing one or more words provided by the user comprises receiving an analog message provided by the user and converted said analog message to a digital message.

11. The method of claim 1, wherein accessing a portion of said message using a software module comprises accessing a portion of said message using a software module, said software module to be remote from the software module, said software application to be in communication with said software module over a network.

12. A method for monitoring electronic communications, comprising:
   receiving a message containing one or more words provided by a user to a software application during an electronic communication;
   accessing at least a portion of said message using a software module;
   generating user profile data, said user profile data to identify said user, said user profile data corresponding to at least one previous message provided by the user;
   generating a result indicative of the likelihood that said message relates to a predetermined subject;
   updating the user profile data with said result; and
   displaying a user level indicator to a system monitor, said user level indicator to be a function of the updated user profile level, said system monitor to be monitoring one or more users concurrently.

13. The method of claim 12, wherein displaying the user level indicator to the system monitor comprises illuminating a series of colored lights, said colored lights to be visible to the system monitor, said colored lights to be illuminated as a function of user level.

14. The method of claim 12, wherein displaying the user level indicator to the system monitor comprises displaying the user level indicator to the system monitor, said system monitor to be monitoring one or more users and receiving user level indicators for said one or more users, said one or more users to provide one or more messages, said user level indicators for said one or more users to be displayed contemporaneously with the receiving of said one or more messages.

15. The method of claim 12, further comprising reducing the ability of the user to continue to provide messages where the user level indicator exceeds a reference user level.

16. An apparatus for monitoring communications, comprising:
a memory including at least one instruction; and
a processor coupled to the memory, the processor, in response to the at least one instruction, to,
receive a message containing one or more words provided by a user to a software application during an electronic communication,
transmit at least a portion of said message to a software module, and
generating user profile data, said user profile data to be used to identify said user, said user profile data corresponding to at least one previous message provided by the user;
providing said user data to said software module;
assign a user level to said user, said user level to be a function of one or more previous messages the user has provided to the software application, said user level to vary as the likelihood that said previous messages relate to the predetermined subject;
assign word values to each of the one or more words contained in the message, said word values to be a function of the likelihood that the one or more words to which said word values are assigned relate to the predetermined subject;
assign word levels to each of the one or more words contained in the message, said word levels to be a function of the likelihood that the one or more words to which said word levels are assigned relate to the predetermined subject;
assign repeated indices to each of the one or more words contained in the message; and
determine a set of counted words, said set of counted words to be a function of the word levels and repeated indices for the one or more words in said message, said set of counted words to further be a function of said user level.

17. The apparatus of claim 16, wherein said software module includes software program code to,
generate a result indicative of the likelihood that said message relates to a predetermined subject,
update said user profile data using said result, and
send said updated user profile data to the software application.

18. The apparatus of claim 16, wherein the software application is executed by said processor.

19. The apparatus of claim 16, wherein the user provides said message to an electronic bulletin board, said electronic bulletin board capable of being accessed over a network by one or more users.

20. The apparatus of claim 16, wherein the software application is one of the following: an e-mail application, an online chat server application, an electronic bulletin board application, a network browser application, and a parental monitoring system application.

21. The apparatus of claim 16, wherein the processor further includes at least one instruction to transmit a segment of the message to the software module over a network, said segment having a predetermined length.

22. The apparatus of claim 21, wherein said segment is determined by an add-on module associated with the software application according to said predetermined length.

23. The apparatus of claim 16, wherein the user profile data includes information relating to the user's identity and a user level, said user level to be a function of the likelihood that the user has provided communications relating to the predetermined subject.

24. The apparatus of claim 16, where said software application is in communication with said software module over a network, said user to be remote from said software application, said user to provide said message to said software application over said network.

25. The apparatus of claim 16, wherein said result is used to update the user profile data before it is sent to the software application.

26. The apparatus of claim 16, where the message provided by the user is an analog message which is converted into a digital message.

27. The apparatus of claim 16, where said software module is remote from said software application, said software module to be in communication with said software application.

28. An apparatus for monitoring communications, comprising:
a memory including at least one instruction;
a processor coupled to the memory, the processor, in response to the at least one instruction, to,
receive a message containing one or more words provided by a user to a software application during an electronic communication,
transmit at least a portion of said message to a software module, and
generating user profile data, said user profile data to be used to identify said user, said user profile data corresponding to at least one previous message provided by the user; and
a user level indicator, said user level indicator to be a function of the updated user profile data, said user level indicator to be visible to a system monitor, said system monitor to monitor one or more users concurrently.

29. The apparatus of claim 28, wherein said user level indicator comprises a series of colored lights, said series of colored lights to be illuminated as a function of the user level.

30. The apparatus of claim 28, wherein the system monitor is to monitor one or more users and receive user level indicators for said one or more users, said one or more users to provide one or more messages, said user level indicator for said one or more users to be displayed contemporaneously with the receiving of said one or more messages.

31. The apparatus of claim 28, wherein the ability of the user to continue to provide messages to said software application is reduced in response to the user level exceeding a reference user level.

32. A computer program product, comprising:
a computer readable medium having computer executable code embodied therein to monitor electronic communications, the computer executable program code in said computer program product comprising:
first computer executable program code to receive an electronic communication containing one or more words provided by a user;
second computer executable program code to access at least a portion of said electronic communication;
third computer executable program code to generate user profile data, said user profile data to be used to identify the user, said user profile data to correspond to at least one previous electronic communication provided by the user;

fourth computer executable program code to generate a result indicative of the likelihood that said electronic communication relates to a predetermined subject;

fifth computer executable program code to update the user profile data with said result;

sixth computer executable program code to assign a user level to said user, said user level to be correspond to one or more previous electronic communications the user has provided to a software application, said user level to vary as the likelihood that said previous electronic communications relate to the predetermined subject;

seventh computer executable program code to assign word values to each of the one or more words contained in the electronic communication, said word values to be a function of the likelihood that the one or more words to which said word values are assigned relate to the predetermined subject;

eighth computer executable program code to assign word levels to each of the one or more words contained in the electronic communication, said word levels to be a function of the likelihood that the one or more words to which said word levels are assigned relate to the predetermined subject;

ninth computer executable program code to assign repeated indices to each of the one or more words contained in the electronic communication; and tenth computer executable program code to determine a subset of words, said subset to be based on the word levels and repeated indices for the one or more words in said electronic communication, said subset to further be based on said user level.

33. A computer program product of claim 32, wherein said first computer executable program code to receive an electronic communication containing one or more words comprises first computer executable program code to receive a text message which has been entered into a computer by said user.

34. A computer program product of claim 33, wherein said first computer executable program code to receive the electronic communication containing one or more words comprises first computer executable program code to receive the electronic communication where said electronic communication has been posted to an electronic bulletin board, said electronic bulletin board capable of being accessed over a network by one or more users.

35. A computer program product of claim 32, wherein said first computer executable program code to receive the electronic communication containing one or more words comprises first computer executable program code to receive the electronic communication containing one or more words provided by the user to a software application, where the software application is one of the following: an e-mail application, an online chat server application, an electronic bulletin board application, a network browser application, and a parental monitoring system application.

36. A computer program product of claim 32, wherein said second computer executable program code to access at least a portion of said electronic communication comprises second computer executable program code to transmit a segment of the electronic communication to a software module over a network, said segment having a predetermined length.

37. A computer program product of claim 36, wherein said second computer executable program code transmits the segment of the electronic communication to a software module over a network, said segment being determined by an add-on module associated with the software application according to said predetermined length.

38. A computer program product of claim 32, wherein said second computer executable program code to generate user profile data comprises computer executable program code to send information relating to the user's identity to a software module, computer executable program code to send a user level to a software module, said user level to be correspond to the likelihood that the user has provided electronic communications relating to the predetermined subject.

39. A computer program product of claim 32, wherein said fourth computer executable program code to generate the result indicative of the likelihood that said electronic communication relates to the predetermined subject comprises computer readable program code to generate the result indicative of the likelihood that said electronic communication relates to the predetermined subject, said updated user profile data to be sent to a software application, said software application to alter the user's ability to continue to provide electronic communications based on the updated user profile data.

40. A computer program product comprising:

a computer readable medium having computer executable code embodied therein to monitor electronic communications, the computer executable program code in said computer program product comprising:

first computer executable program code to receive an electronic communication containing one or more words provided by a user;

second computer executable program code to access at least a portion of said electronic communication;

third computer executable program code to generate user profile data, said user profile data to be used to identify the user, said user profile data to correspond to at least one previous electronic communication provided by the user;

fourth computer executable program code to generate a result indicative of the likelihood that said electronic communication relates to a predetermined subject;

fifth computer executable program code to update the user profile data with said result;

sixth computer executable program code to send said user profile data to a software application, wherein said software application is to alter the user's ability to continue to provide electronic communications based on the updated user profile data; and seventh computer executable program code to display a user level indicator to a system monitor, said user level indicator to correspond to the updated user profile level, said system monitor to be monitoring one or more users concurrently.

41. A computer program product of claim 40, wherein said seventh computer executable program code to display the user level indicator to the system monitor comprises computer program executable code to display the user level indicator to the system monitor, said system monitor to be monitoring one or more users and receiving user level indicators for said one or more users, said one or more users to provide one or more messages, said user level indicators for said one or more users to be displayed contemporaneously with the receiving of said one or more messages.

42. The method of claim 1, accessing a portion of said message using a software module comprises accessing a portion of said message using a software module, said software module to be remote from the software module, said software application to be in communication with said software module over a network, said user to be remote from said software application, said user to provide said message to said software application over said network.

* * * * *